US009964770B2

(12) United States Patent
Guo (10) Patent No.: US 9,964,770 B2
(45) Date of Patent: May 8, 2018

(54) HEAD MOUNTED DISPLAY (71) Applicant: SHENZHEN ROYOLE TECHNOLOGIES CO. LTD., Shenzhen (CN)

(72) Inventor: Jilong Guo, Shenzhen (CN)

(73) Assignee: SHENZHEN ROYOLE TECHNOLOGIES CO. LTD., Shenzhen, Guangdong Province (CN)

( * ) Notice: Subject to any disclaimer, the term of this patent is extended or adjusted under 35 U.S.C. 154(b) by 56 days.

(21) Appl. No.: 15/059,119

(22) Filed: Mar. 2, 2016

(65) Prior Publication Data

US 2017/0090201 A1 Mar. 30, 2017

Related U.S. Application Data (63) Continuation of application No. PCT/CN2015/090860, filed on Sep. 27, 2015.

(51) Int. Cl.
*G02B 27/01* (2006.01)

(52) U.S. Cl.
CPC .. *G02B 27/0176* (2013.01); *G02B 2027/0154* (2013.01)

(58) Field of Classification Search
CPC .................. G02B 2027/0154; G02B 27/0176
(Continued)

(56) References Cited

U.S. PATENT DOCUMENTS 5,321,416 A * 6/1994 Bassett .................. A42B 3/145
345/8
6,424,321 B1 * 7/2002 Ronzani ............... G02B 27/017
345/102

(Continued)

FOREIGN PATENT DOCUMENTS

CN 102918443 A 2/2013
CN 104503086 A 4/2015

(Continued)

OTHER PUBLICATIONS

Royole Technologies Co. Ltd., International Search Report and Written Opinion, PCT/CN2015/090860, dated Jul. 21, 2016, 11 pgs.

*Primary Examiner* — Tony Davis
(74) *Attorney, Agent, or Firm* — Morgan, Lewis & Bockius LLP (57) ABSTRACT

The present application relates to a head mounted display device which includes a display device defining a first connection opening; two earphone bodies each defining a second connection opening; and a connection frame comprising two connection arms connecting the two earphone bodies to the display device, each connection arm comprising a first connection end connected to the first connection opening and a second connection end connected to a corresponding second connection opening, and defining an inner chamber extending through the first connection end and the second connection end. Each earphone body is electrically connected to the display device via a flexible printed circuit housed in the inner chamber, and a first end of the flexible printed circuit is connected to the display device via the first connection opening and a second end of the flexible printed circuit is connected to a corresponding earphone body via a corresponding second connection opening.

19 Claims, 5 Drawing Sheets

(58) Field of Classification Search
USPC .................................................... 345/8, 630
See application file for complete search history.

(56) References Cited

U.S. PATENT DOCUMENTS

| | | | |
|---|---|---|---|
| 2002/0005819 A1* | 1/2002 | Ronzani | G02B 27/017 345/8 |
| 2002/0163486 A1 | 11/2002 | Ronzani et al. | |
| 2007/0256107 A1* | 11/2007 | Anderson, Jr. | H04H 20/61 725/81 |
| 2014/0078333 A1* | 3/2014 | Miao | H04N 5/23212 348/222.1 |
| 2016/0018659 A1* | 1/2016 | Miyagawa | G02B 27/0176 359/630 |

FOREIGN PATENT DOCUMENTS

| | | |
|---|---|---|
| CN | 104503584 A | 4/2015 |
| CN | 104765149 A | 7/2015 |
| CN | 204575970 U | 8/2015 |

\* cited by examiner

HEAD MOUNTED DISPLAY

RELATED APPLICATION

The application is a continuation application of PCT Patent Application No. PCT/CN2015/090860, entitled "HEAD MOUNTED DISPLAY" filed on Sep. 27, 2015, which is incorporated by reference in its entirety.

TECHNICAL FIELD

The present disclosure relates to wearable displays, and particularly to a head mounted display.

BACKGROUND

Head mounted display (HMD) utilizes near-eye display technology to enlarge images on a micro display generated by a group of optical system (mainly composed of precise optical lens), and further projects the enlarged images to retina of eyes, so as to show large screen display effect to users. Because the shape of the head mounted display is similar to that of the glasses, the head mounted display is often named to be video glasses, which provides a product concept of portable home theater.

For most present products, the portability of head mounted display can be improved by plugging an earplug-style earphone thereunto via wires, which enables carry-on and portable concept of "home theater" to be commercialization. However, the audio effect of the earplug-style earphone is common. Also, the wire of the earplug-style earphone is exposed outside, which may cause the following problems.

The first problem is that the wires may be easily damaged due to redundancy of the wires of the earphone.

The second problem is that integrity and appearance of the product may be affected due to exposure of the wire of the earphone.

According to this, there is a need to provide a head mounted display, in which the earphone can be effectively coupled to the display device, thereby solving the problems caused by exposure of the wire of the earphone and also enhancing the integrity of the product.

SUMMARY

The present application provides a head mounted display which can effectively solve the above technical problems.

Embodiments of the present application provides a head mounted display device which includes a display device comprising a display module housed therein and defining a first connection opening; two earphone bodies each comprising a sounding module housed therein and defining a second connection opening; and a connection frame comprising two connection arms connecting the two earphone bodies to the display device, each connection arm comprising a first connection end connected to the first connection opening and a second connection end connected to a corresponding second connection opening, and defining an inner chamber extending through the first connection end and the second connection end. Each of the earphone bodies is electrically connected to the display device via a flexible printed circuit housed in the inner chamber, and a first end of the flexible printed circuit is connected to the display module via the first connection opening and a second end of the flexible printed circuit is connected to a corresponding earphone body via a corresponding second connection opening.

The head mounted display provided by embodiments of the present application comprises the connection frame used to connect each earphone body to one of two opposite ends of the display device. The connection frame defines the inner chamber. Each earphone body is electrically connected to the display module via the flexible printed circuit board housed in the inner chamber. By doing so, a more secure wiring can be realized by fully utilizing the connection frame. The use of the flexible printed circuit board can cause the connection frame to be light and thin, which can effectively enhance the portability and miniaturization of the head mounted display.

BRIEF DESCRIPTION OF THE DRAWINGS

Various embodiments of the present application will be specifically illustrated in combination with the detailed embodiments and the following accompanying drawings. It should be understood that each component in the accompanying drawings is not representative of the actual size and scale, which is schematic just for clear illustration, and is not to be construed as a limitation of the present application.

DETAILED DESCRIPTION

To better understand purposes, technical solutions, and advantages of the present application, the following will further illustrate the present application in combination with various embodiments and the accompanying drawings. It should be understood that the specific embodiments described herein are merely used to illustrate the present application, and are not a limitation of the present application.

In the description of the present application, the "first", "second" are merely used for description, and cannot be understood to indicate or imply relative importance or implicitly indicate the number of the indicated technical features. Therefore, features with a limitation of "first" or "second" can explicitly or implicitly include one or more features. In the description of the present application, "multiple" means two or more than two, unless there is a specific limitation.

In the description of the present application, it should be noted that, unless explicitly stated or limited, the terms "mount", "connected" and "connection" should be broadly understood, for example, it may be a fixed connection, or may be a detachable connection, or an integral connection; it may be a mechanical connection, or may be an electrical connection, or may be communication with each other; it may be directly connected, or may be indirectly connected via intermediary, or may be communication between interiors of two elements or interactions between two elements. Those skilled in the art can understand the specific definition of above terms in the present application according to specific conditions.

The following disclosure provides many different embodiments or examples, for realizing different structures of the present application. In order to simplify the present disclosure, the following will describe components and setting of specific examples. Certainly, thereby are just examples, and are not intended to limit the present application. Furthermore, in the present application, reference numerals and/or reference letters may be repeated in different embodiments. This repetition is for the purpose of simplicity and clarity, and does not indicate relationships among various embodiments and/or settings discussed herein.

Figure 1:
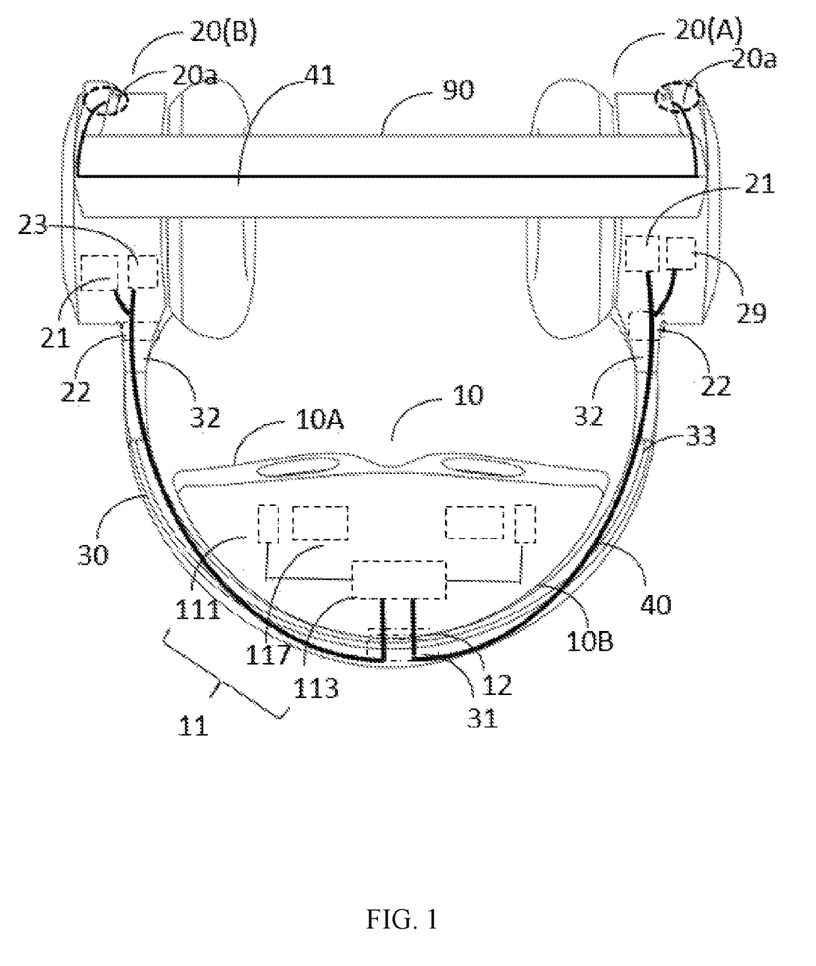
FIG. 1 is a schematic view of a structure of a head mounted display in accordance with a first embodiment of the present application.

Referring to FIG. 1, a head mounted display 1 in accordance with a first embodiment of the present application includes a display device 10 for display, two earphone bodies 20, and a head mounted frame 90 used to connect the two earphone bodies 20. Specifically, each earphone body 20 includes a sounding module 21 arranged thereunto, for example, a speaker, and the sounding module 21 is used to provide audio output. The two earphone bodies 20 are respectively connected to the display device 10 via two ends of a connection frame 30, and are arranged at two opposite sides of the display device 10. When a user wears the device, the display device 10 is located in front of user's eyes, and the two earphone bodies 20 are respectively put on left and right ears of the user. Thus, the user can immerse herself in audio and video content provided by the head mounted display. It should be noted that the head mounted display includes but not limited to a head mounted video player, a head mounted gaming device, a head mounted navigation device, or a head mounted medical device.

Specifically, the display device 10 includes a display module 11 arranged therein. The display module 11 includes a display unit 111 used to provide display source. According to the near-eye display concept, a micro display is generally used as the display unit 111. To provide a good display effect, enlarged virtual images generated by the display source are projected to user's eyes via an optical module 117. Specifically, the display module 11 can include two micro displays and two sets of optical modules 117, thus each of the two sets of optical modules 117 can project display source light provided by the corresponding micro display into the user's eyes via a corresponding window, which can enable the user to watch the enlarged virtual images. The near-eye display concept is known in the art and will not be repeated herein. However, it should be noted that the display module 11 can also include just one micro display, and two output paths are generated via the two sets of optical modules. The micro display can be an organic light-emitting diode (OLED), and can also be a liquid crystal display (LCD). In the present application, the type of the display unit 111 is not limited.

The display module 11 can further include an audio and video processing unit 113. The display unit 111 is connected to an output port of the audio and video processing unit 113. Specifically, the audio and video processing unit 113 can be a circuit board having audio and video processing functions, and it can be used to convert multimedia signals into video signals, which can be played by the display unit 111, thereby allowing the display unit 11 to display and output display source.

The audio and video processing unit 113 can be further used to convert multimedia signals into audio signals which can be played by the sounding module 21. For this, the display device 10 defines a first connection opening 12, and the earphone body 20 defines a second connection opening 22, both of which are used to realize wiring connection of the display module 11 and the earphone body 20. Specifically, the first connection opening 12 provides a wiring exit of internal wire of the display device 10. The exposed wire can be embedded into the earphone body 20 via the connection frame 30. Specifically, the connection frame 30 includes two connection arms, each connection arm including a first connection end 31 connected to the first connection opening 12 and a second connection end 32 connected to the second connection opening 22, and defines an inner chamber extending through the first connection end 31 and the second connection end 32. Thus, when the connection arm connects each earphone body 20 to the corresponding end of the opposite ends of the display device 10, wires can be hidden in the inner chamber 33. Therefore, the purpose of hiding electrical wires of a product can be realized. The connection between the first connection end 31 and the first connection opening 12, and the connection between the second connection end 32 and the second connection opening 22 can be an integral fixed connection, a latching connection, a position-limiting connection, or other. As the connection arm defines the inner chamber 33 extending through the first connection end 31 and the second connection end 32, the first connection end 31 and the second connection end 32 are respectively openings of the inner chamber 33, and connected to the first connection opening 12 and the second connection opening 22, respectively.

Preferably, each sounding module 21 is electrically connected to the display module 11 via a flexible printed circuit (FPC) 40. A first end of the FPC 40 is connected to the display module 11 via the first connection opening 12 and a second end of the FPC 40 is connected to the corresponding earphone body 20 via the second connection opening 22. By doing so, the connection frame 30 is light and thin, which can effectively enhance portability and miniaturization of the product.

In the first embodiment, the connection frame 30 is an arc-shaped object, and the shape is similar to C. The second connection ends 33 are respectively arranged at two ends of the arc-shaped object, that is, arranged at two ends at an opening of the arc-shaped object. The first connection end 31 is arranged near the middle portion of the arc. The two inner chambers 33 respectively formed between the two second connection ends 32 at two ends of the arc-shaped object and the first connection ends 31, communicate with each other, that is, the arc-shaped object connection frame 30 defines the inner chamber 33 extending through two ends of the connection frame 30. Correspondingly, the first connection opening 12 is arranged at a position of the display device 10 where the display device 10 meets the first connection end 31. In this embodiment, the arc-shaped object connection frame 30 can cover a surface 10B opposite to a display side 10A of the display device 10, and the first connection opening 12 is arranged at the middle of the surface 10B. In this embodiment, two FPCs 40 are included. One end of each FPC 40 is connected to the audio and video processing unit 113, and the other end of the FPC 40 enters the corresponding earphone body 20 via the inner chamber 33 defined between the first connection end 31 of the connection frame 30 and the second connection opening 22 of the connection frame 30 in a direction toward the earphone body 20. In other embodiments, one FPC 40 may be employed to realize electrical connection between the display module 11 and the earphone bodies 20 arranged at two ends of the display module 11. For example, one end of the FPC 40 is connected to the audio and video processing unit 113, and the other end of the FPC 40 is separated into two parts extending out of the first connection opening 12 to form a configuration the shape of which is similar to "Y", thus at the other end two separate parts are formed and each separate part is connected to the corresponding earphone body 20 via the inner chamber 33. In this embodiment, the connection frame 30 is elastic. As only the middle portion of the connection frame 30 is connected to the display device 10, the parts of the connection frame 40 other than the middle portion can be separated from the display device 10. Compared with the structure in which the part of the connection frame 30 covering the display device 10 is fully fixed to the display device 10, this structure can effectively reduce the clapping force when one earphone body 20 is pulled away from the other earphone body 20. Thus, a user with big head can enjoy a more comfortable wearing experience. Also, the possibility of damaging the device by applying a force to separate the two earphone bodies 20 can be effectively reduced.

Figure 5:
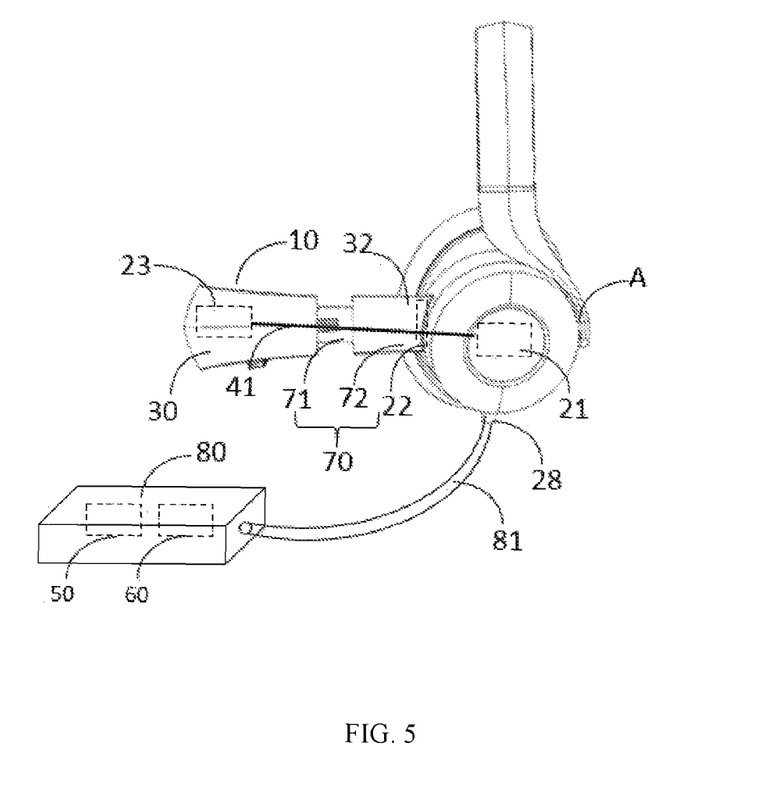
FIG. 5 is schematic view of a head mounted display in accordance with another embodiment of the present application.

It should be noted that the FPC of one earphone body 20 connected to the audio and video processing unit 113 can be used as a signal output wiring, and the FPC of another earphone body 20 connected to the audio and video processing unit 113 can be used as an audio output wiring connected to the other earphone body 20. As shown in FIG. 5, it is assumed that the foregoing earphone body 20 is A, and another earphone body 20 is B. At this point an audio output wiring 41 is connected to the audio and video processing unit 113, and enters the inner chamber 33 via the first connection opening 12, and enters the second connection opening 22 of the earphone body A via the second connection end 32 corresponding to the earphone body A, so as to be connected to the sounding module 21 of the earphone body A.

In this embodiment, the head mounted display can further include a retractable structure 70 to change the distance between the earphone body 20 and the display device 10. The retractable structure 70 can include a retractable arm 71 and a sliding slot 72 for limiting the sliding. Specifically, the connection frame 30 can include the retractable structure 70. The connection frame 30 includes a first connection arm having the retractable arm 71 which defines the inner chamber 33, and a second connection arm where the sliding slot 72 is defined in the inner chamber 33. When the first connection arm and the second connection arm are connected to each other via the retractable structure 70, the communication inner chamber 33 is still existed. Specifically, the connection frame 30 includes a limitation structure which limitation sliding portion is housed in a limiting structure of the sliding slot 72. Another end of the first connection arm where the retractable arm 71 is arranged can be set to be one of the first connection end 31 and the second connection end 32. Another end of the second connection arm where the sliding slot 72 is defined can be set to be another one of the first connection end 31 and the second connection end 32. Therefore, the retractable arm 71 can be limited to slide in the sliding slot 72, which can adjust the distance between the display device 10 and the earphone body 20, so as to provide individualized adjusting manners for different users having different head shapes, thus the wearing comfortability of the users can be enhanced. However, in the present application, the retractable structure 70 is not limited to this. Those skilled in the art can flexibly make changes according to known retractable structures. That is, what is needed is that the retractable structure 70 defines the inner chamber 33 and the inner chamber 33 can communicate with the second connection opening 22 of the earphone body 20 and the first connection opening 12 of the display device 10.

Figure 3:
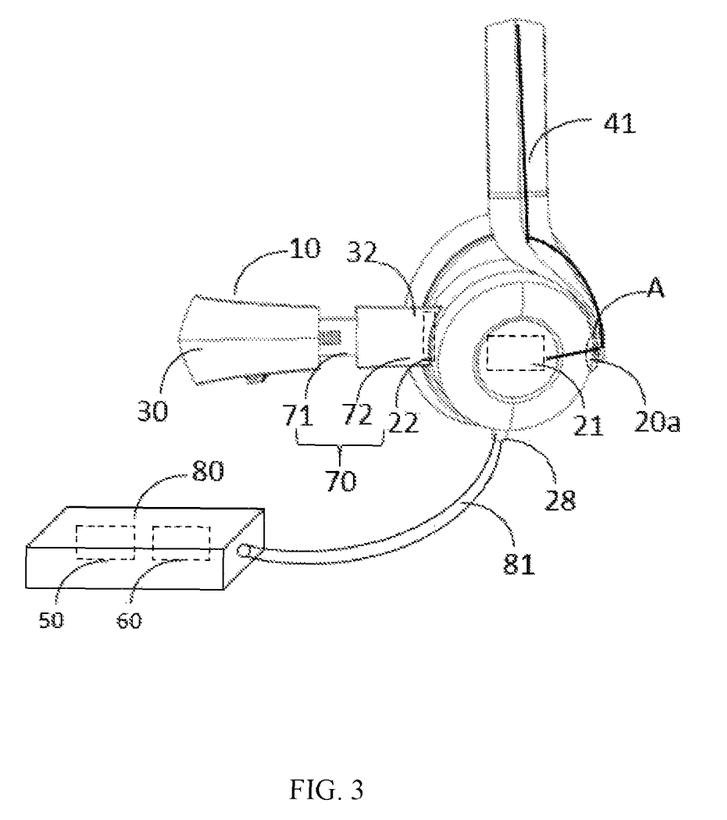
FIG. 3 is a right side view of the head mounted display in accordance with the first embodiment of the present application.

In other embodiments, the connection frame 30 and one of the earphone body 20 or the connection frame 30 and the display device 10 can form the retractable structure 70. As shown in FIG. 3, the connection frame 30 includes two connection arms, and the opposite ends of each connection arm respectively include the first connection end 31 and the second connection end 32. Correspondingly, the display device 10 defines two first connection openings 12 respectively arranged at two opposite ends of the display device 10. In this manner, the connection frame 30 and the earphone body 20 or the connection frame 30 and the display device 10 can form the retractable structure. Specifically, one of the retractable arm 71 having the inner chamber 33 and the inner chamber 33 defining the sliding slot 72 can be arranged at the first connection opening 12 of the display device 10 or the second connection opening 22 of the earphone body 20, and the other of the retractable arm 71 and the inner chamber 33 can be arranged at a corresponding connection end of the connection frame 30.

For the above embodiment which includes the retractable structure 70, the length of the FPC 30 can be set to have some redundancy, which allow that, even when the retractable structure 70 is pulled to the longest distance, that is, when the distance between the earphone body 20 and the display device 10 reaches the greatest value, the FPC 30 will not be damaged.

Figure 2:
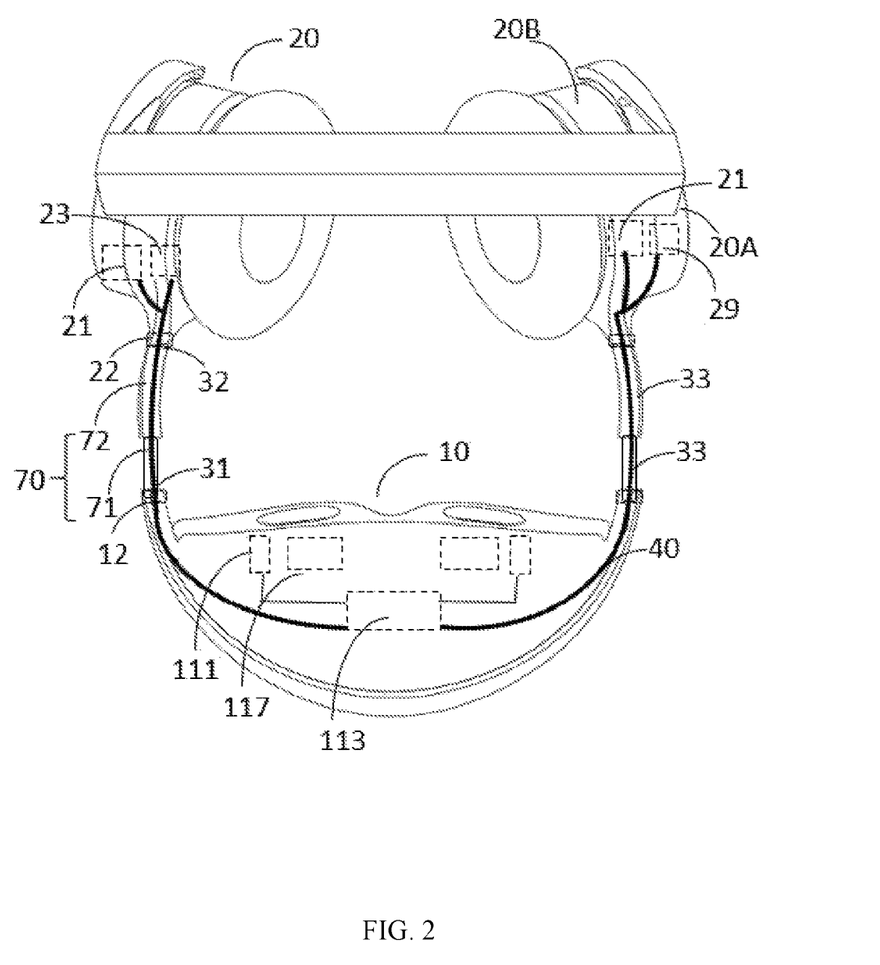
FIG. 2 is a schematic view of a structure of a head mounted display in accordance with a second embodiment of the present application.

Preferably, referring to FIG. 2, the head mounted display can further include a head mounted frame 90. Opposite ends of the head mounted frame 90 can be respectively connected to the corresponding earphone bodies 20. The FPC of one earphone body 20 connected to the audio and video processing unit 113 can be used as a signal output wiring, the FPC of another earphone body 20 connected to the audio and video processing unit 113 can be used as an audio output wiring connected to the other earphone body 20. Referring to FIG. 1 and FIG. 2, it is assumed that the foregoing earphone body 20 is A, and another earphone body 20 is B. The head mounted frame 90 defines the inner chamber 91 extending through two ends of the head mounted frame 90. The earphone body 20 further includes a fourth connection opening 20a, so as to connect the audio output wiring 41 to the earphone body A via the fourth connection opening 20a.

Preferably, the earphone body 20 can further include two rotation members which can rotate relative to each other. One end of the head mounted frame 90 and the corresponding second connection end 32 of the connection frame 30 are respectively connected to the two rotation members of the earphone body 20. The rotation member connected to the second connection end 32 of the connection frame 30 defines the second connection opening 22. In this embodiment, each earphone body 20 includes a first rotation member 20A and a second rotation member 20B which can rotate relative to each other. Two ends of the head mounted frame 90 are respectively connected to the corresponding first rotation members 20A. Each second connection opening 22 is defined at the corresponding rotation member 20B. The second connection end 32 of the connection frame 30 is connected to the second connection opening 22 of the second rotation member 20B. Thus, the head mounted frame 90 and the display device 10 can be folded to overlap each other due to relative rotation of the two rotation members 20A, 20B, so as to facilitate storage.

In the above embodiments, both of the display device 10 and the earphone body 20 have a certain housing space, that is, have a space for housing electronic components. Specific arrangement positions of components can be flexibly selected according to needs. The following will illustrate the wiring principle of the present application in conjunction with a detailed embodiment, and is not used to limit the present application.

The head mounted display device 1 further includes a noise reduction function. Specifically, the earphone body 20 further includes a noise reduction unit 23. The sounding module 21 is connected to the output end of the noise reduction unit 23, and connected to another end of the FPC 40 of the earphone body 20 via the noise reduction unit 23. In this manner, only one earphone body 20 includes the noise reduction unit 23. Specifically, the noise reduction unit 23 is a circuit board having the noise reduction function. Noise reduction technology is known by those skilled in the art, and will not be repeated herein.

In this embodiment, the FPC of one earphone body 20 connected to the audio and video processing unit 113 can be used as a signal output wiring, and the FPC of another earphone body 20 connected to the audio and video processing unit 113 can be used as an audio output wiring connected to the other earphone body 20. It is assumed that the foregoing earphone body 20 is A, and another earphone body 20 is B. It is assumed that the noise reduction unit 23 is arranged within the earphone body B, at this point the audio output wiring 41 can be set. One end of the audio output wiring 41 is connected to the noise reduction unit 23, and the other end enters the inner chamber 91 which extends through two ends of the head mounted frame 90 via the fourth connection opening 20a of the earphone body B, and also connected to the corresponding sounding module 21 via the fourth connection opening 20a of the earphone body A.

Figure 4:
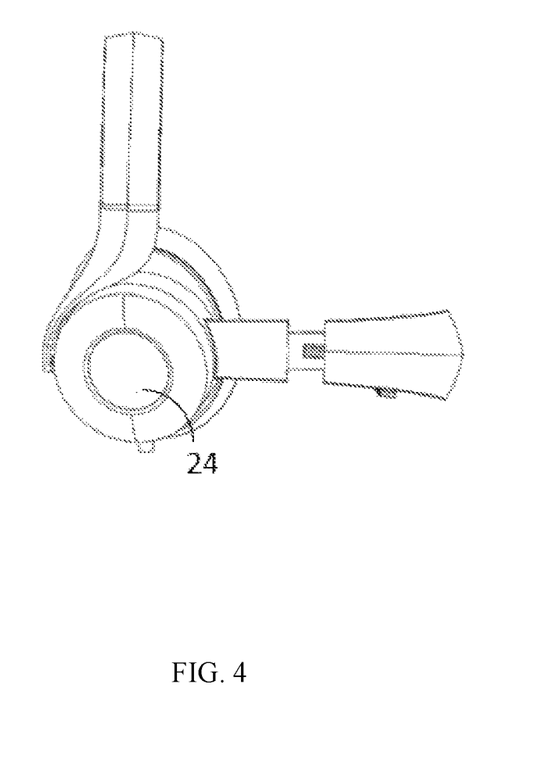
FIG. 4 is a schematic view of a structure of a touch control unit in accordance with an exemplary embodiment of the present application.

Preferably, the earphone body 20 can further include a touch function. Specifically, as shown in FIG. 4, the earphone body 20 further includes a touch control unit 24 electrically connected to another end of the FPC 40 of the earphone body 20 having the touch control unit 24 thereon. As the other end of the FPC 40 needs to be connected to the sounding module 21 of the earphone body 20, the FPC having a "Y" shape can be employed. The separate parts of the other end of the FPC 40 can be respectively connected to the sounding module 21 and the touch control unit 24 of the earphone body 20. The touch control unit 24 is arranged on the outside of the earphone body 20, that is, arranged on one side opposite to the side which closes to an ear of a user, thereby allowing the user to touch the earphone body 20 to perform touch control.

Another earphone body 20 can include a power source 50 and a processing unit 60. The housing space of the earphone body 20 and the display device 10 can be fully utilized to arrange components. Also, wiring within a product can be realized by the connection frame 30 which defines the inner chamber 33.

As a preferred embodiment, the head mounted display device can further include a processing device 80, and the power source 50 and the processing unit 60 are configured to be an independent device for supplying power to the display device 10 and the earphone device 20 via a data line 81, and the power source 50 and the processing unit 60 can communicate with the display device 10 and the earphone device 20. The processing unit 60 can be a processing center of the head mounted display device. By doing so, the weight of the head mounted part can be effectively reduced, which can enhance user's wearing experience. In this embodiment, at least one earphone body 20 includes a third connection opening 28. The data line 81 is connected to the corresponding earphone body 20 via the third connection opening 28. Specifically, the earphone body 20 includes a signal conversion module 29 used to realize signal conversion between the FPC 40 and the data line 81, so as to realize signal transmission. Specifically, the data line 81 is connected to the signal conversion module 29 via the third connection opening 28. The other end of the FPC 40 of the earphone body 20 is further connected to the signal conversion module 29. Specifically, the FPC 40 having a "Y" shape can be employed. The separate parts of another end of the FPC 40 can be respectively connected to the sounding module 21 and the signal conversion module 29 of the earphone body 20.

Specifically, the third connection opening 28 can be set to be an interface of the data line 81.

In other embodiments, the processing device 80 can only include the power source 50, or can only include the processing unit 60, or can further include a wireless communication unit.

In a preferred embodiment of the present application, the FPC 40 can be set to include three layers, i.e., a top layer, a middle layer and a bottom layer. The middle layer is a data wiring layer, the top layer covering a top surface of the middle layer and the bottom layer covering a bottom surface of the middle layer are grounded and shielding layers. Specifically, the top layer and the bottom layer can be connected to ground wires of the middle layer by via holes. In this manner, electromagnetic radiation can be effectively reduced.

In a preferred manner, power source wiring of the FPC can be arranged on the first layer or the second layer. In this manner, when the processing device supplies power to the display device 10 and the earphone bodies 20, the voltage difference is relatively smaller, thereby stabilizing signal transmission.

The foregoing description is only the preferred embodiments of the present application, but is not intended to limit the scope of the invention. Accordingly, any modification, alternatives, improvements or the like within the spirit and principles of the present application should be included in the scope of the present application.

What is claimed is:
1. A head mounted display, comprising:
a display device comprising a display module housed therein and defining a first connection opening;
two earphone bodies each comprising a sounding module housed therein and defining a second connection opening; and
a connection frame comprising two connection arms connecting the two earphone bodies to the display device, each connection arm comprising a first connection end connected to the first connection opening and a second connection end connected to a corresponding second connection opening, and defining an inner chamber extending through the first connection end and the second connection end;
wherein each of the earphone bodies is electrically connected to the display device via a flexible printed circuit housed in the inner chamber, and a first end of the flexible printed circuit is connected to the display module via the first connection opening and a second end of the flexible printed circuit is connected to a sounding module of a corresponding earphone body via a corresponding second connection opening;

wherein the flexible printed circuit comprises a top layer, a middle layer, and a bottom layer, the middle layer being a data line wiring layer, the top layer covering a top surface of the middle layer and the bottom layer covering a bottom surface of the middle layer and including ground and shield layers.

2. The head mounted display of claim 1, wherein there is a retractable structure between the display device and at least one of a corresponding earphone body, the retractable structure is configured to change a distance between the earphone body and the display device.

3. The head mounted display of claim 1, further comprising:
a processing device configured to supply power to the display device and the earphone bodies via a data line, and communicate with the display device and the earphone bodies;
at least one of the earphone bodies defines a third connection opening, the data line is connected to the corresponding earphone body via the third connection opening.

4. The head mounted display of claim 3, wherein the earphone body defining the third connection opening further comprises a signal conversion module, the data line is connected to the signal conversion module via the third connection opening, the second end of the flexible printed circuit of the earphone body is further connected to the signal conversion module.

5. The head mounted display of claim 1, wherein the display module comprises an audio and video processing unit and a display unit connected to an output port of the audio and video processing unit, the first end of the flexible printed circuit is connected to the audio and video processing unit.

6. The head mounted display of claim 1, wherein the earphone body further comprises a noise-reduction unit, the sounding module is connected to an output port of the noise reduction unit, the noise reduction unit is connected to the second end of the flexible printed circuit.

7. The head mounted display of claim 1, wherein power source wirings of the flexible printed circuit are arranged in the top layer or the bottom layer.

8. The head mounted display of claim 1, further comprising a head mounted frame having two opposite ends, each of which is connected to a corresponding earphone body.

9. The head mounted display of claim 8, wherein each earphone body defines a fourth connection opening, the head mounted frame defines a head mounted inner chamber extending through two opposite ends of the head mounted frame, and the head mounted frame comprises an audio output wire housed in the head mounted inner chamber, the audio output wire passes through each fourth connection opening of the two earphone bodies to output audio signals.

10. The head mounted display of claim 9, wherein each of the earphone bodies comprises a first rotation member and a second rotation member capable of rotating relative to the first rotation member, each of the fourth connection openings is arranged at the first rotation member, and each of the second connection openings is arranged at the corresponding second rotation member.

11. A head mounted display, comprising:
a display device comprising a display module housed therein and defining a first connection opening;
two earphone bodies each comprising a sounding module housed therein and defining a second connection opening; and
a connection frame comprising two connection arms connecting the two earphone bodies to the display device, each connection arm comprising a first connection end connected to the first connection opening and a second connection end connected to a corresponding second connection opening, and defining an inner chamber extending through the first connection end and the second connection end;
wherein each of the earphone bodies is electrically connected to the display device via a flexible printed circuit housed in the inner chamber, and a first end of the flexible printed circuit is connected to the display module via the first connection opening and a second end of the flexible printed circuit is connected to a sounding module of a corresponding earphone body via a corresponding second connection opening;
wherein at least one of the earphone bodies further comprises a touch control unit, the second end of the flexible printed circuit being further connected to the touch control unit.

12. The head mounted display of claim 11, wherein the connection frame is an arc-shaped object with the second connection ends arranged at two ends of the arc-shaped object and the first connection ends arranged in a middle of the arc-shaped object, each second connection end arranged at one end of the arc-shaped object and a corresponding first connection end defining one of two inner chambers communicating with each other;
the first connection opening is arranged at a position where the display device meets the first connection end.

13. The head mounted display of claim 11, further comprising a head mounted frame having two opposite ends, each of which is connected to a corresponding earphone body.

14. The head mounted display of claim 13, wherein each earphone body defines a fourth connection opening, the head mounted frame defines a head mounted inner chamber extending through two opposite ends of the head mounted frame, and the head mounted frame comprises an audio output wire housed in the head mounted inner chamber, the audio output wire passes through each fourth connection opening of the two earphone bodies to output audio signals.

15. The head mounted display of claim 11, wherein there is a retractable structure between the display device and at least one of a corresponding earphone body, the retractable structure is configured to change a distance between the earphone body and the display device.

16. The head mounted display of claim 11, further comprising:
a processing device configured to supply power to the display device and the earphone bodies via a data line, and communicate with the display device and the earphone bodies;
at least one of the earphone bodies defines a third connection opening, the data line is connected to the corresponding earphone body via the third connection opening.

17. The head mounted display of claim 11, wherein the display module comprises an audio and video processing unit and a display unit connected to an output port of the audio and video processing unit, the first end of the flexible printed circuit is connected to the audio and video processing unit.

18. The head mounted display of claim 11, wherein the earphone body further comprises a noise-reduction unit, the sounding module is connected to an output port of the noise reduction unit, the noise reduction unit is connected to the second end of the flexible printed circuit.

19. A head mounted display, comprising:
- a display device comprising a display module housed therein and defining a first connection opening;
- two earphone bodies each comprising a sounding module housed therein and defining a second connection opening;
- a connection frame comprising two connection arms connecting the two earphone bodies to the display device, each connection arm comprising a first connection end connected to the first connection opening and a second connection end connected to a corresponding second connection opening, and defining an inner chamber extending through the first connection end and the second connection end; and
- a head mounted frame having two opposite ends, each of which is connected to a corresponding earphone body,
- wherein each of the earphone bodies is electrically connected to the display device via a flexible printed circuit housed in the inner chamber, and a first end of the flexible printed circuit is connected to the display module via the first connection opening and a second end of the flexible printed circuit is connected to a sounding module of a corresponding earphone body via a corresponding second connection opening;
- wherein each earphone body defines a fourth connection opening, the head mounted frame defines a head mounted inner chamber extending through two opposite ends of the head mounted frame, and the head mounted frame comprises an audio output wire housed in the head mounted inner chamber, the audio output wire passes through each fourth connection opening of the two earphone bodies to output audio signals;
- wherein each of the earphone bodies comprises a first rotation member and a second rotation member capable of rotating relative to the first rotation member, each of the fourth connection openings is arranged at the first rotation member, and each of the second connection openings is arranged at the corresponding second rotation member.

* * * * *